Jan. 7, 1969 J. SONIA ET AL 3,419,938
MULTI-CHANNEL TUBULAR EXTRUSION DIE
Filed Jan. 21, 1965 Sheet 1 of 3

INVENTORS
JOHN SONIA
HILLARD W. POUNCY, JR.
BY *Walter C. Kehm*
ATTORNEY

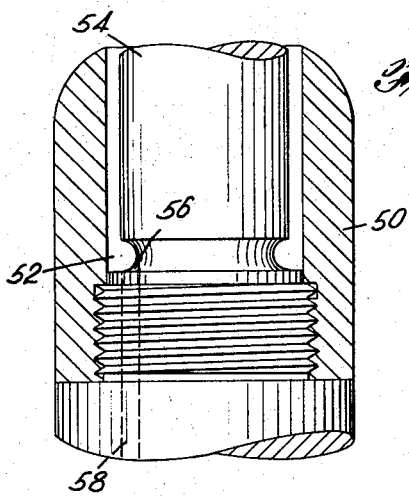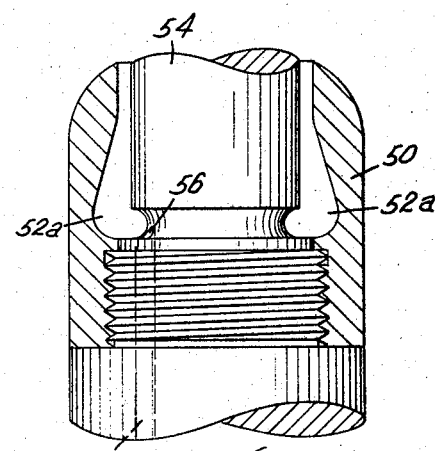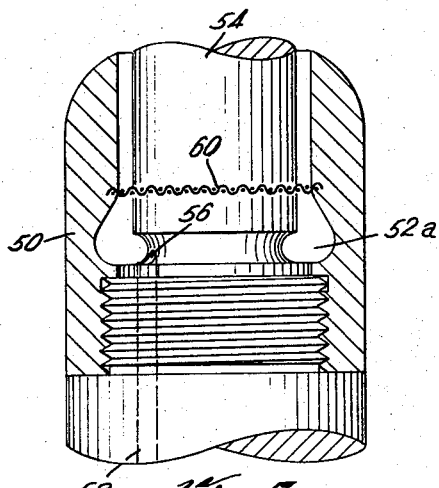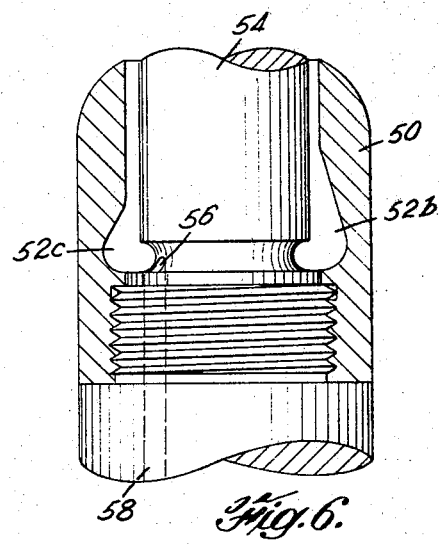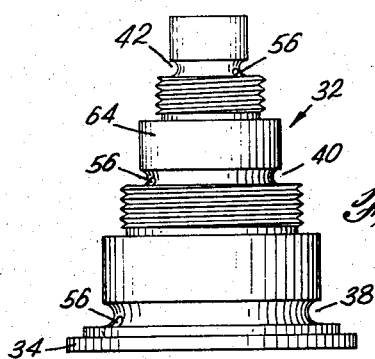
INVENTORS
JOHN SONIA
HILLARD W. POUNCY, JR.
ATTORNEY

INVENTORS
JOHN SONIA
HILLARD W. POUNCY, JR.

ATTORNEY

United States Patent Office 3,419,938
Patented Jan. 7, 1969

3,419,938
MULTI-CHANNEL TUBULAR EXTRUSION DIE
John Sonia, Califon, and Hillard W. Pouncy, Jr., Somerset,
N.J., assignors to Union Carbide Corporation, a corporation of New York
Filed Jan. 21, 1965, Ser. No. 426,833
U.S. Cl. 18—14                    10 Claims
Int. Cl. B29d 23/04

ABSTRACT OF THE DISCLOSURE

Multi-ply single sheet polymer films are obtained by simultaneously extruding different polymer layers through a tubular die having a plurality of concentric extrusion passages therein which terminate in an extrusion orifice. The polymer layers are extruded from the die as a tubular laminate.

---

This invention relates to an apparatus for extruding multi-ply polymer films. More particularly, this invention relates to a multi-channel tubular extrusion die which is capable of producing, in one step, polymer films having a plurality of plies laminated together to form a single film sheet.

Heretofore, polymer films consisting of two or more plies have been obtained by employing individual dies capable of extruding only one and, at most, two polymer resins, or by sheet film casting processes wherein individual sheets of film are singly cast. These individual films must then be laminated in subsequent operations in order to produce a multi-ply polymer film.

Due to the number of steps involved and the coordination of separate apparatus which must be employed to produce polymer films having two or more plies, the films obtained have not been satisfactory. Furthermore, the economics involved in such production methods do not render them commercially attractive. Additionally, the polymer resins employed have to be carefully selected since they are not always compatible for subsequent lamination to obtain polymer films comprised of two or more plies consisting of different polymer resins.

It is an object of this invention, therefore, to provide an apparatus capable of simultaneously extruding a plurality of different polymer resins.

Another object of this invention is to provide an apparatus whereby the extruded polymer resins are laminated into a single sheet polymer film in one step.

A further object of this invention is to provide an apparatus capable of producing single sheet polymer films comprised of a plurality of separate plies of different polymer resin films.

A still further object of this invention is to provide an apparatus the construction of which can be readily and easily modified to alter the flow characteristics of the individual polymer resins as they are simultaneously extruded.

These and further objects will become more clear from the ensuing discussion.

Now, in accordance with the present invention, multi-ply, single sheet polymer films can be obtained by simultaneously extruding different polymer resins through an apparatus which comprises means for conveying different polymer resins from their respective, individual extruders; a die ring connected to the conveying means; a die pin means positioned within said ring; and collar means within said die ring and connected to the die pin means which direct and distribute the flow of said polymer resins within said die ring.

In one embodiment of the present invention there are provided a circumferentially and longitudinally tapered groove die pin and a plurality of circumferentially and longitudinally tapered cylinders which are connected to the die pin.

In another embodiment of this invention there is provided a circumferentially and longitudinally tapered cylinder which is substantially of one-piece construction.

The multi-passage tubular extrusion die of the present invention will become more clear when considered in connection with the accompanying drawings which form a part of this specification and wherein:

FIGURE 3 is an elevational view, partially in section, illustrating the flow restraining and distribution collars;

FIGURE 4 is an elevational view, partially in section, illustrating one manner in which the flow restraining and distribution collars can be modified;

FIGURE 5 is an elevational view, partially in section, illustrating still another manner in which the flow restraining and distribution collars can be modified;

FIGURE 6 is an elevational view, partly in section, illustrating still a further manner in which the flow restraining and distribution collars can be modified;

FIGURE 7 is an elevational view illustrating a die pin assembly;

Figure 1:
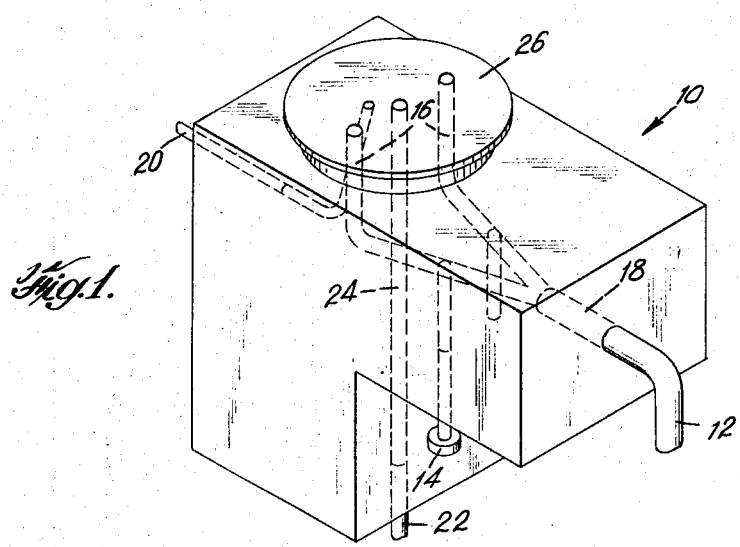
FIGURE 1 is an isometric view illustrating a flow divider manifold.

Referring now to the drawings wherein like reference numerals designate like parts, there is shown in FIGURE 1 a flow divider manifold housing 10 provided with feed lines 12 and 22 which convey the individual polymer resins from their separate extruders. Feed line 12 is provided with a port divider 18 within the body of the manifold housing which separates the resin flow of one resin into different internal feed lines 16 within the manifold. Internal feed line 24 conveys the resin conveyed from feed line 22.

While feed line 12 is illustrated as being divided into only two separate feed lines within the manifold, it should be understood that main polymer resin feed lines, such as 12 and 22, can be provided with any number of separate feed lines within the manifold depending upon the number of film layers ultimately desired and that port divider 18 can optionally be provided outside the body of the manifold housing.

It should be additionally understood that a plurality of different resins can be introduced into the manifold by providing an equal number of main polymer resin feed lines as different resins desired to be extruded. For example, separate polymer resin feed lines can be provided for conveying polypropylene, polystyrene, ethylene-acrylic acid copolymers, nylon and so forth, each from its own extruder. Once the particular polymer resin has been conveyed to the manifold, each resin feed line can be further divided into separate resin feed lines within the manifold, depending upon the number of layers desired in the final film product as well as the number of layers of each particular polymer resin desired. Hence, it can be readily seen that the location in the film product of each polymer resin layer can also be controlled. A particular polymer resin can thus be directed to the outermost layer, innermost layer or anyone of several intermediate layers within the structure of the multi-ply polymer film obtained. In this manner, also, resins which are incompatible can be laminated to each other by directing an adhesive between the plies of the incompatible resin films.

In one embodiment of the present invention, metering valves 14 are connected to internal feed lines 16 as they leave port divider 18 so that the rate of flow of each polymer resin can be controlled as it is conveyed into the die pin assembly. In this manner, the thickness ratio of the various resin layers can be regulated such that the multi-ply polymer film obtained will have a substantialy uniform wall thickness or, if desired, will have varying wall thicknesses to create, for example, a design effect.

There is also provided, in one embodiment of this invention, an air channel 20 which conveys air into the die pin assembly to facilitate the formation of the primary air bubble. This channel or a plurality of other similar channels, can also be used to provide other services. For example, such channels can be employed to circulate cool air throughout the die pin to maintain low die temperatures. They can also be employed as feed lines for water which can then be directed to a mandrel, coil, ring or other suitable apparatus to act as a cooling system within the die and thereby substantially lower the temperature of the film as it leaves the die. Such cooling means can act to materially improve the rate of production since, as is well known in the art, thick films; that is, films which have a thickness of about 10 mils or more, and which are extruded at relatively high temperatures of between about 200° C.–300° C., are extruded only very slowly. Hence, rapidly cooling the temperature of the films to between about 50° C. to 100° C. and lower as they leave the die will increase their rate of extrusion and result in increased production.

The manifold housing is provided with a mounting means, such as flanged channel 26 in FIGURE 1, through which the internal feed lines convey the individual polymer resins and upon which the die housing and die pin assembly can be mounted. It should be understood that any other suitable means can be employed to convey the individual resins into the die housing and die pin assembly as well as connect the die housing and pin assembly to the manifold housing.

Figure 2:
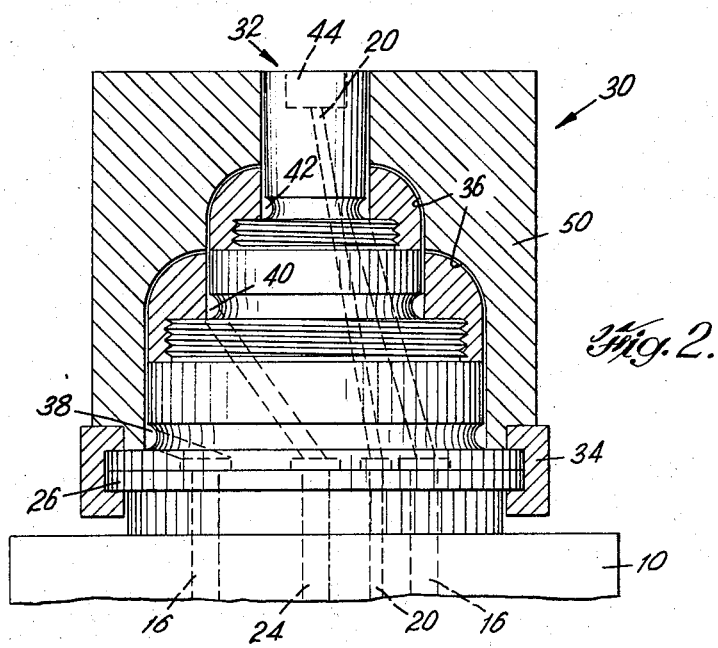
FIGURE 2 is an elevational view, partially in section, illustrating a die ring and tri-channel pin assembly.

Turning now to FIGURE 2, there is shown a die assembly 30 in which there is contained die ring 50 and a die pin assembly 32. A connecting means 34 is employed to secure the die assembly 30 to the manifold housing 10 over the flanged channel 26. Any suitable connecting means can be employed for this purpose such as clamps, bolts, couplings and so forth. In a preferred embodiment of this invention, a temperature-compensating coupling is employed as the connecting means.

Flow restraining and distribution collars 36 are positioned on the outer surfaces of the die pin assembly and within the wall of the die housing.

In the die pin assembly 30 illustrated in FIGURE 2, the outermost resin layer of a triple-ply polymer film, for example, begins to form in the die at 38, the middle resin layer begins to form at 40 while the innermost layer begins to form at 42. The die pin assembly can also be provided with a threaded receptacle, such as at 44, to accommodate extension pieces to the die pin, such as a manifold, coil, ring and so forth, which can then be utilized as part of the cooling system in the die pin assembly as set forth hereinabove.

In FIGURES 3 and 4, there are illustrated individual die pins 54 with their respective, individual flow restraining and distribution collars 50. Internal polymer resin feed line 58 conveys the polymer resin into the flow restraining and distribution collars at outlet 56. The geometry of the polymer resin annular passage is formed by the die pin 54 and the adjacent wall of the flow restraining and distribution collar 50.

The distance over which the resin flows after leaving the outlet, such as at 56, between the die pin 54 and the flow restraining and distribution collar 50 and including the environmental geometry indicated at 52 is commonly termed the "length of the land." It should be understood, therefore, that when the term "land" is employed herein it is intended to mean that area defined immediately hereinabove.

As shown in FIGURE 4 the passage housed within the flow restraining and distribution collars can be altered by modifying the geometry of the flow restraining and distribution collars as at 52a, thereby also altering the length of the land.

FIGURE 5 illustrates another embodiment of the invention wherein a homogenizing screen 60 has been inserted in the die pin assembly immediately above the environment of the flow restraining and distribution collar at 52a to further modify the passage housed within the flow restraining and distribution collar and thereby alter the polymer resin enviroment by still another means. Homogenizing screens having a mesh of between about 5–30 and, preferaby, between about 10–25 have been found to be suitable for this purpose.

Still a further way in which the geometry of the flow restraining and distribution collars can be changed is illustrated in FIGURE 6 at 52b and 52c. As is shown, the length of the land formed in one side of the flow restraining and distribution collar 50 is greater than that on the other side. By altering the length of the land in this manner, the distribution and rate of flow of the polymer resins can be further controlled and regulated.

It can be readily seen, therefore, that by modifying and altering either the geometry of the flow restraining and distribution collars or varying the length of the land or both, that annular passage through which the polymer resins must flow can be closely controlled and regulated. As a result, compensation can be made for any variations in the rates of flow of the polymer resins, the pressures exerted by the resins and so forth. This, in turn, enables one to obtain a multi-ply polymer film which is substantially uniform in thickness with little or no trace of weld lines and which can subsequently be subjected to a greater degree of stretching when biaxially oriented.

In FIGURE 7, there is illustrated a completely assembled die pin without the die housing.

Figure 8:
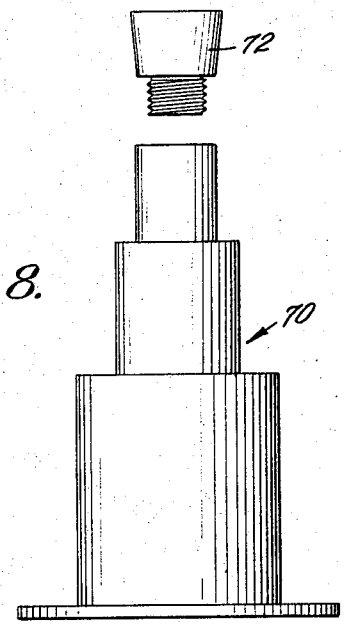
FIGURE 8 is an elevational view illustrating a die pin of substantially one piece construction.

FIGURE 8 illustrates a still further embodiment of the present invention wherein the tapered groove die pin 70 is of substantially one-piece construction having a removable end section 72 to accommodate changes in the die housing when desired.

The metals, alloys and other compositions which can be used to produce the multi-channel tubular extrusion die of the present invention are not critical. For example, nickel, steel, stainless steel, aluminum and various steel alloys can be readily employed. Steels or steel alloys capable of being plated with chromium or nickel are among the more economical metals which can be used. Generally, chrome-plated metals will produce dies with smooth surfaces and good wear resistance in normal extrusion operations. Nickel-plated metals, on the other hand, will produce dies which offer high corrosion resistance when corrosive resins, such as resins with a chloride substituent, are to be extruded.

Selection of the proper metal or plating to be applied to the metal base in producing the tubular extrusion die of the present invention will be generally guided by such factors as the nature of the resins to be extruded, production costs and so forth.

Figure 9:
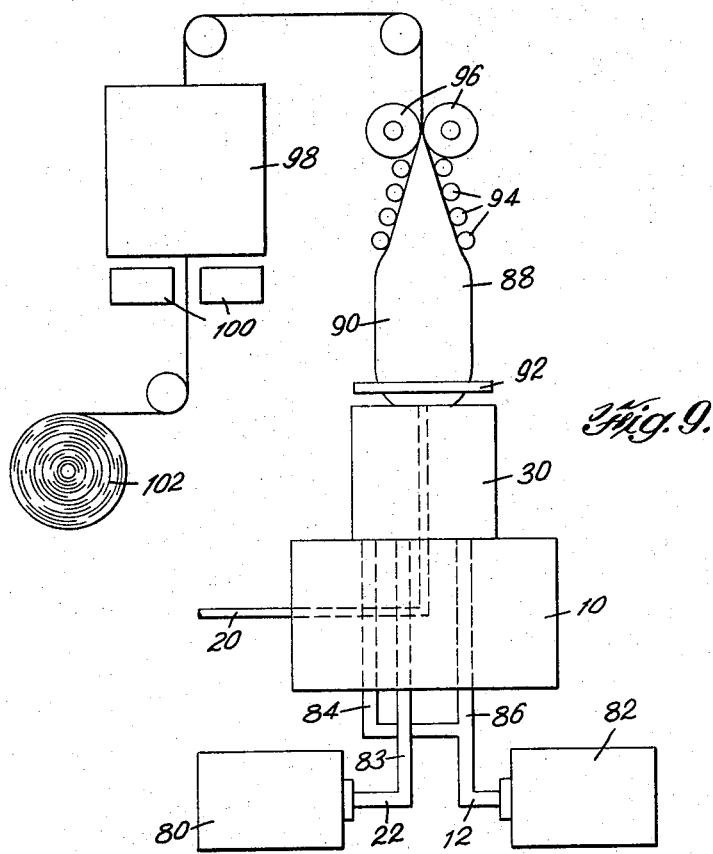
FIGURE 9 is a schematic illustrating one method by which the multi-ply films of the present invention can be produced.

As exemplified in the schematic process illustrated in FIGURE 9, multi-ply films of the present invention can be obtained by providing at least two different polymer resins from their own extruders. In this illustration, polypropylene is supplied by extruder 80 and the polyethylene is supplied by extruder 82. Inlet feed 22 conveys the polypropylene resin to the manifold housing 10 while inlet feed 12 conveys the polyethylene resin to the manifold housing. Within the manifold housing the polyethylene resin flow is separated by means of a port divider into two internal feed lines which convey the polyethylene to the die housing and pin assembly 30 comprising a tri-coaxial extrusion die. One internal feed line 83 conveys the polypropylene resin to the die pin assembly where it will be extruded as the middle layer of the tubular film while internal feed lines 84 and 86 convey the polyethylene resin to the die pin assembly for extrusion as the outermost and innermost layers. The internal feed lines can be provided with metering valves so that the rate of flow of each resin stream can be regulated and the thickness and flat width of the tubular film controlled. An air bubble 90 is formed in the resulting tubular film 88 at the outlet of the die housing. An air cooling ring 92, supplied by an external air supply, is provided to facilitate extrusion of the film by cooling the film as it leaves the die.

The tubular film is then passed through a faltening ladder 94 assisted by nip rollers 96 which also act to seal the leading edge of the extruded film as it leaves the die thereby facilitating the formation of the primary bubble.

The multi-ply film is then passed through an orientation zone 98 where it is biaxially oriented. This process is generally accomplished in the presence of heat and consists, generally, of subjecting the film to stress in at least two directions; that is the film is subjected to stress applied in the same direction in which the film is travelling and to stress applied traversely to the direction of travel of the film. During this operation, the multi-ply film is heated such that the outermost layer, or layers are in a molten state and are still in this state as the film leaves the orientation zone.

In order to obtain clear films, the film is rapidly cooled as it leaves the orientation zone by means of a suitable cooling device 100. Among the means that can be employed for this purpose are devices such as a water bath, jet streams of refrigerated air, cold water sprays and so forth.

When the film has been thus rapidly cooled, it is prevented from "taking a set"; that is, the molten layer, or layers, of the film have no opportunity to crystallize. This results in obtaining multi-ply films that are remarkably clear.

When the film is cooled slowly, as by permitting the film to cool at room temperature, the molten outer layers of the film "set"; that is, at least part of the molten layers of the film begin to crystallize. This results in films that are hazy or cloudy.

The film is finally collected on a film wind-up roll 102.

The multi-ply films obtained from the apparatus of the present invention have been found to exhibit properties which are equal to or better than similar films obtained by other processes and utilizing other apparatus.

Several films were extruded with the tubular extrusion die of the present invention and subjected to various tests to determine their physical properties. The polymer resins employed and their laminate location in the multi-ply films obtained are identified and set forth in Table I below wherein melt index is designated as MI, melt flow is designated as MF, and density is designated as $d$.

TABLE I

| | Film ply | Polymer resin | Polymer resin properties |
|---|---|---|---|
| Film A | Outer and inner | Polyethylene | 1.7–2.4 MI; 0.924 d. |
| | Middle | Polypropylene | 0.7–1.0 MF at 230° C; 0.905 d. |
| Film B | Outer and inner | Polyethylene | 4.5–7.5 MI; 0.933 d. |
| | Middle | Polypropylene | 0.7–1.0 MF at 230° C.; 0.905 d. |
| Film C | Outer and inner | Polyethylene | 4.5–7.5 MI; 0.933 d. |
| | Middle | Polypropylene | 0.7–1.0 MF at 230° C.; 0.905 d. |
| Film D | Outer and inner | Ethylene-acrylic acid copolymer. | 7.0 MI; 18% acrylic acid. |
| | Middle | Polypropylene | 0.7–1.0 MF at 230° C.; 0.905 d. |
| Film E | Outer and inner | Ethylene-acrylic acid copolymer. | 10.0 MI; 10.5% acrylic acid. |
| | Middle | Polypropylene | 0.7–1.0 MF at 230° C.; 0.905 d. |

The optical properties of Film A from Table I above were determined when the film was permitted to cool at room temperature and when the film was rapidly air-cooled in order to ascertain the effect of cooling as the film leaves the orientation zone. The findings are set forth in Table II below wherein the percent haze was determined according to ASTM D–1003–61T, percent gloss was determined according to ASTM D–523–53T, the percent Specular light transmission was determined according to test methods which satisfy the requirements of ASTM D–523–53T, and the coefficient of friction was computed by well known methods.

TABLE II

| Film A | Percent haze | Percent gloss | Percent specular light transmission | Coefficient of friction |
|---|---|---|---|---|
| Air-cooled | 2.4 | 85.8 | 73.5 | 0.47 |
| Cooled at room temperature | 4.4 | 80.3 | 64.5 | 0.40 |

As can be readily seen from Table II, the air-cooled film exhibited significantly better optical properties then did the film which was cooled at room temperature.

The effect on the optical and frictional properties of films which have been biaxially oriented are set forth in Table III below wherein the same ASTM standards set forth hereinabove were employed to determine percent haze, percent specular light transmission, coefficient of friction and percent gloss.

The results obtained were compared to an uncoated polypropylene film which was used as a control.

TABLE III

| Film | Percent haze | Percent gloss | Percent specular light transmission | Coefficient of friction |
|---|---|---|---|---|
| A | 2.2 | 85.4 | 80.2 | 0.40 |
| B | 2.5 | 86.6 | 70.8 | 0.68 |
| C | 3.3 | 92.6 | 72.5 | 0.39 |
| D | 5.8 | 80.1 | 44.8 | 0.61 |
| E | 3.0 | 79.7 | 43.3 | 0.69 |
| Control | 1.2 | 84.8 | 82.5 | 0.19 |

The tensile properties of biaxially oriented films were also determined and these results are set forth in Table IV below. The tensile strength, percent elongation and secant modulus were determined in accordance with ASTM D–882–61T and tensile impact was determined in accordance with ASTM D–1882–61T wherein the specimen was placed in the head of the apparatus. The designation MD and TD in Table IV are understood to mean "in the machine direction" and "in transverse direction," respectively. The same control film was employed as for Table III above.

TABLE IV

| Film | Film thickness (mils) | Tensile strength (p.s.i.) MD | Tensile strength (p.s.i.) TD | Percent elongation MD | Percent elongation TD | Secant modulus (p.s.i.) MD | Secant modulus (p.s.i.) TD | Tensile impact (ft. lbs/in.³) MD | Tensile impact (ft. lbs/in.³) TD |
|---|---|---|---|---|---|---|---|---|---|
| A | 0.6 | 24.5×10³ | 22.2×10³ | 70 | 46 | 270×10³ | 299×10³ | 538 | 495 |
| B | 0.6 | 29.2×10³ | 28.7×10³ | 90 | 87 | 244×10³ | 234×10³ | 564 | 503 |
| C | 0.6 | 18.5×10³ | 19.9×10³ | 92 | 54 | 242×10³ | 294×10³ | 526 | 469 |
| D | 0.6 | 18.5×10³ | 19.5×10³ | 108 | 66 | 234×10³ | 280×10³ | 469 | 444 |
| E | 1.5 | 12.6×10³ | 11.2×10³ | 99 | 85 | 138×10³ | 178×10³ | 697 | 434 |
| Control | 0.6 | 22.5×10³ | 28.5×10³ | 64 | 45 | 347×10³ | 395×10³ | 440 | 396 |

The permeability of biaxially oriented films was also determined and these results are set forth in Table V below wherein the water vapor transmission was determined in accordance with ASTM D–96–53T, and oxygen permeability determined in accordance with ASTM 1434–58. The control film was the same as above.

TABLE V

| Film | Film thickness (mils) | Water vapor transmission (gm./24 hr) | Oxygen permeability (cc./100 inches$^2$/24 hr.) |
|---|---|---|---|
| A | 0.6 | 15.6056 | 182.4 (0.5 mil) |
| B | 0.6 | 19.0639 | 144.0 (0.7 mil) |
| C | 0.6 | 16.0189 | 154.0 (0.5 mil) |
| D | 0.6 | 15.4751 | 184.8 (0.5 mil) |
| E | 1.5 | 18.5528 | 129.0 (1.2 mil) |
| Control | 0.6 | 20.4015 | 120.0 (0.6 mil) |

Although the present invention has been described in terms of a tri-channel tubular extrusion die, it is well within the scope of the present invention to provide tubular extrusion dies having any desired number of channels and which are capable of extruding films consisting of a plurality of different resins.

Additionally, the tubular extrusion dies of the present invention can be manufactured and scaled up or down to obtain sheets of multi-ply films in any desired widths.

The multi-ply films extruded with the tubular extrusion die of the present invention can be further processed, such as by blow molding, to obtain such articles as containers, bottles, decorative panels and so forth.

It should be understood that while the invention has been described in detail and with particularity, changes, modifications and alterations may be made in the apparatus and its construction without departing from the spirit and scope of the invention.

What is claimed is:

1. A die assembly for extruding a multi-layered article comprising,
    (a) a die ring,
    (b) a die pin having removable segments therein positioned within said die ring, said pin and ring together defining a plurality of concentric annular passages, said passages converging to form an annular extrusion orifice and
    (c) a plurality of ducts connecting with said passages for supplying said passages with extrudable material.

2. The apparatus of claim 1 wherein at least some of said ducts are non-connecting with each other.

3. The apparatus of claim 1 wherein at least some of said passages have annular homogenizing screens mounted thereacross for screening the flow of material in said passages.

4. The die assembly of claim 1 wherein said die pin has a collar mounted thereon and said passages are defined between said die pin, said collar and said die ring.

5. The apparatus of claim 1 wherein the die pin is a circumferentially and longitudinally tapered grooved die pin.

6. The die assembly of claim 1 wherein said die pin has a removable collar mounted thereon within said die and said passages are defined between said collar and said die ring, said collar and die pin and said die ring and die pin.

7. The apparatus of claim 6 wherein the length of the land formed by the inner wall of said collar is altered to reflect variable cross-sections and flow characteristics in the passage defined by said collar and said die pin.

8. The die assembly of claim 6 wherein a plurality of removable collars are mounted on said die pin.

9. The die assembly of claim 6 wherein said die pin is comprised of stacked grooved cylindrical segments of progressively reduced diameter, at least some of said cylindrical segments each having a collar of corresponding outer diameter mounted thereon, which collar has an inner diameter of sufficient size to define an annular passages with the next segment thereabove, a die ring disposed about said die pin and collars, said die ring having an inner surface contoured to define with the outer surfaces of said collars and the exposed surfaces of said die pin an annular channel which extends in progressively reduced diameters to the die face of said assembly.

10. The homogenizing screen of claim 3 wherein the mesh is between about 10–25.

References Cited

UNITED STATES PATENTS

| | | |
|---|---|---|
| 2,257,104 | 9/1941 | Burrows et al. |
| 2,593,136 | 4/1952 | Gliss. |
| 3,296,662 | 1/1967 | Raley. |

WILLIAM J. STEPHENSON, *Primary Examiner.*

U.S. Cl. X.R.

18—13